United States Patent
Matsunaga

(10) Patent No.: US 7,740,038 B2
(45) Date of Patent: Jun. 22, 2010

(54) PNEUMATIC TIRE FOR MOTORCYCLE

(75) Inventor: Satoshi Matsunaga, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 247 days.

(21) Appl. No.: 11/540,676

(22) Filed: Oct. 2, 2006

(65) Prior Publication Data
US 2007/0102089 A1 May 10, 2007

(30) Foreign Application Priority Data
Nov. 10, 2005 (JP) ............................. 2005-325885

(51) Int. Cl.
B60C 9/00 (2006.01)
B60C 15/00 (2006.01)

(52) U.S. Cl. .................. 152/539; 152/550; 152/552; 152/554

(58) Field of Classification Search ............... 152/550, 152/551, 552, 553, 554, 555, 539
See application file for complete search history.

(56) References Cited

U.S. PATENT DOCUMENTS 5,441,093 A * 8/1995 Shirasyouji et al. ......... 152/454
5,647,929 A 7/1997 Suzuki
2004/0221938 A1 11/2004 Ochiai
2004/0250938 A1 12/2004 Matsunami

FOREIGN PATENT DOCUMENTS

| EP | 1495881 A1 | 1/2005 |
| JP | 2000-177337 | * 6/2000 |
| JP | 2000-211317 A | 8/2000 |

* cited by examiner

Primary Examiner—Justin Fischer
(74) Attorney, Agent, or Firm—Birch, Stewart, Kolasch & Birch, LLP

(57) ABSTRACT

A tire 2 comprises a tread 4, a sidewall 6, a bead 8, a carcass 10 and a belt 12. The belt 12 includes a belt ply 26. The belt ply 26 is formed by a ribbon 28 wound spirally in a circumferential direction of the tire 2. The carcass 10 includes a first carcass ply 22 and a second carcass ply 24 provided on an outside in a radial direction of the first carcass ply 22. The first carcass ply 22 is turned up around the bead 8. The first carcass ply 22 includes a turned-up portion 34 extended almost outward in the radial direction and a turned-up end 36 positioned on an outside in the radial direction of the turned-up portion 34. The turned-up end 36 is positioned on an inside of the second carcass ply 24.

4 Claims, 3 Drawing Sheets

PNEUMATIC TIRE FOR MOTORCYCLE

This application claims priority on Patent Application No. 2005-325885 filed in JAPAN on Nov. 10, 2005, the entire contents of which are hereby incorporated by reference.

BACKGROUND OF THE INVENTION

1. Field of the Invention

The present invention relates to a pneumatic tire for a motorcycle.

2. Description of the Related Art

An improvement of a highway network has advanced and a vehicle is caused to run at a high speed for a long time. A performance of the vehicle has been enhanced remarkably. In a tire to be used in the vehicle, a further enhancement in a critical performance has been demanded.

As a tire for a motorcycle, a radial tire is used. The tire includes a carcass ply in a carcass. The carcass ply is turned up around a bead.

Japanese Laid-Open Patent Publication No. 2004-352226 has disclosed a tire for a motorcycle which suppresses an increase in a weight of the tire and is excellent in a straight running stability and a cornering stability. In the tire, a carcass portion includes a first ply and a pair of second plies. The first ply is wrapped around a bead core and is turned-up toward an outside. The first ply has an overlapping portion. The second ply is inserted in the overlapping portion and is extended along the first ply.

In a tire in which the carcass is constituted by a first carcass ply and a second carcass ply stacked on an outside in a radial direction of the first carcass ply, the first carcass ply and the second carcass ply are turned up around a bead from an inside toward an outside in an axial direction in some cases. A sidewall of the tire has a high stiffness. An excessive stiffness damages a ride comfort of the tire.

In respect of an enhancement in the ride comfort, in a tire in which only the first carcass ply is turned up around the bead, a turned-up portion extended almost outward in a radial direction of the first carcass ply is stacked on an outside of the second carcass ply in some cases. In the tire, the effect of reinforcing the carcass by the turned-up portion is insufficient. In the tire, a sufficient cornering force cannot be obtained. In cornering, a twist is easily generated on the tire. Such a tire has a worse cornering stability.

It is an object of the present invention to provide a pneumatic tire for a motorcycle in which a handling stability and a ride comfort are not damaged but a cornering stability is enhanced.

SUMMARY OF THE INVENTION

A pneumatic tire for a motorcycle according to the present invention comprises a tread having an external surface to form a tread surface, a pair of sidewalls extended almost inward in a radial direction from an end of the tread, a pair of beads extended almost inward in the radial direction from the sidewalls, a carcass laid between both of the beads along insides of the tread and the sidewalls, and a belt provided on the carcass at an inside in the radial direction of the tread. The belt includes a belt ply. The belt ply is formed by a ribbon wound spirally in a circumferential direction of the tire. The ribbon has a belt cord. An absolute value of an angle formed by the belt cord with respect to an equator plane is equal to or smaller than 5 degrees. The carcass includes a first carcass ply and a second carcass ply provided on an outside in the radial direction of the first carcass ply. The first carcass ply is constituted by a first carcass cord and a topping rubber. An absolute value of an angle formed by the first carcass cord with respect to the circumferential direction is equal to or greater than 60 degrees and is equal to or smaller than 90 degrees. The second carcass ply is constituted by a second carcass cord and a topping rubber. An absolute value of an angle formed by the second carcass cord with respect to the circumferential direction is equal to or greater than 60 degrees and is equal to or smaller than 90 degrees. The first carcass ply is turned up around the bead. The first carcass ply includes a turned-up portion extended almost outward in the radial direction and a turned-up end positioned on an outside in the radial direction of the turned-up portion. The second carcass ply includes an inner end positioned on an inside in the radial direction. The turned-up end is positioned on an inside of the second carcass ply. When a point placed on the tread surface and having a circumferential length from the tread end which is a quarter of a half circumferential length of the tread surface is represented by PA, a middle point of a straight line connecting the tread end and a heel of the bead is represented by PB, a point on an external surface of the tire which corresponds to the turned-up end is represented by P1 and a point on the external surface of the tire which corresponds to the inner end is represented by P2, the point P1 is placed on an inside in the radial direction from the point PA. The point P2 is placed on an outside in the radial direction from the point PB.

In the tire, the turned-up end is covered with the second carcass ply. Therefore, the turned-up portion sufficiently reinforces the carcass. The carcass has a high stiffness. In the tire, a sufficient cornering force is generated. In cornering, a twist is not generated on the tire. In the tire, a structure of the carcass is controlled in such a manner that an overlap of the turned-up portion and the second carcass ply is placed in a proper position of the tire. The carcass effectively increases the stiffness of the tire. The tire is excellent in the cornering stability without damaging a handling stability and a ride comfort.

DESCRIPTION OF THE PREFERRED EMBODIMENTS

The present invention will be described below in detail based on a preferred embodiment with reference to the drawings.

Figure 1:
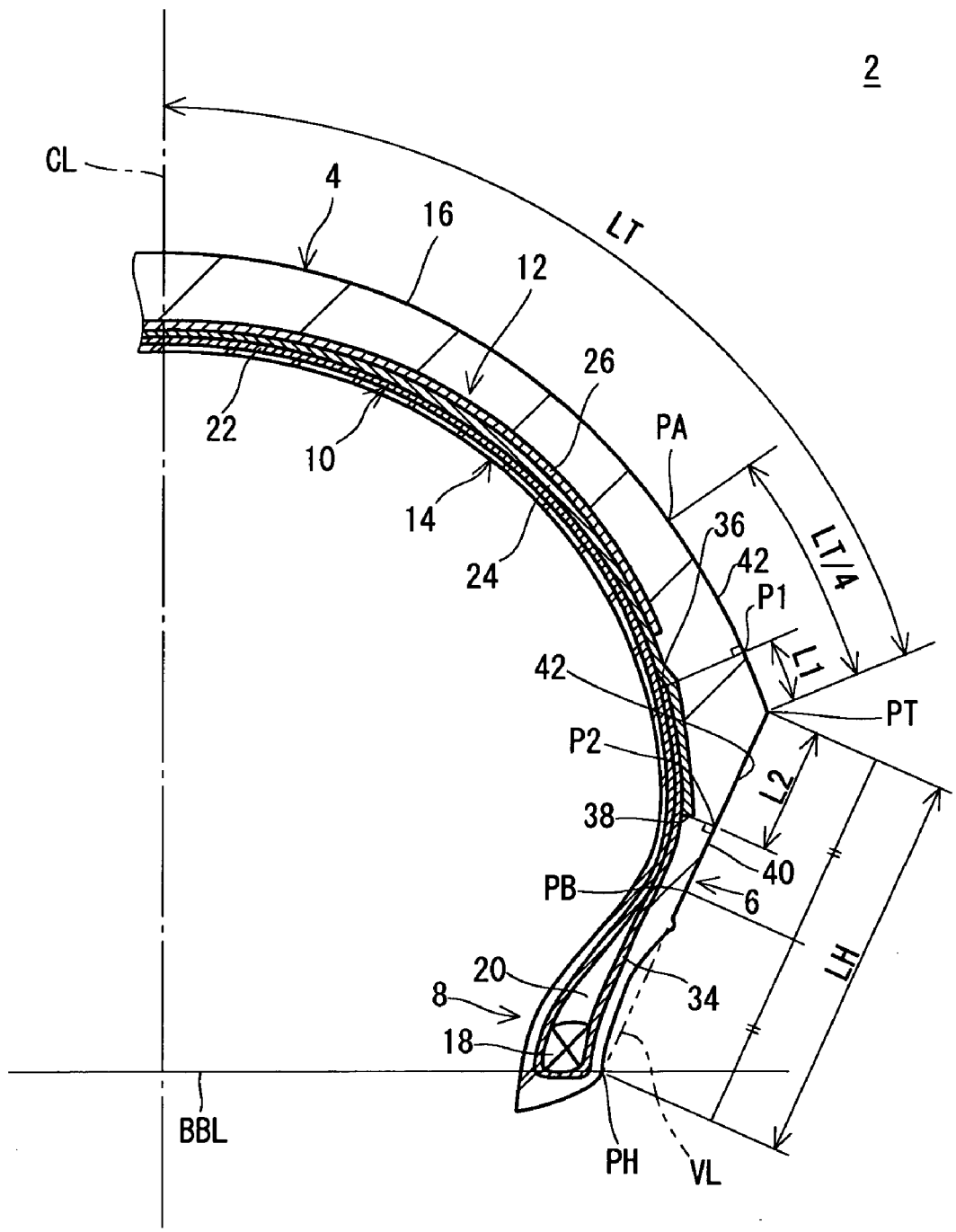
FIG. 1 is a sectional view showing a part of a tire for a motorcycle according to an embodiment of the invention.

A tire 2 for a motorcycle shown in FIG. 1 comprises a tread 4, a sidewall 6, a bead 8, a carcass 10, a belt 12, and an inner liner 14. The tire 2 is a pneumatic tire of a tubeless type. In FIG. 1, a vertical direction is set to be a radial direction of the tire 2, a transverse direction is set to be an axial direction of the tire 2, and a perpendicular direction to a paper is set to be a circumferential direction of the tire 2. The tire 2 takes an almost symmetrical shape about a one-dotted chain line CL in FIG. 1. The one-dotted chain line CL represents an equator plane of the tire 2.

The tread 4 is formed by a crosslinked rubber and takes the shape of an outward convex in the radial direction. The tread 4 forms a tread surface 16 to come in contact with a road surface. A groove may be provided on the tread surface 16 to form a tread pattern.

The sidewall 6 is extended almost inward in the radial direction from an end of the tread 4. The sidewall 6 is formed by a crosslinked rubber. The sidewall 6 absorbs a shock from the road surface. Furthermore, the sidewall 6 prevents the external damage of the carcass 10.

The bead 8 is extended almost inward in the radial direction from the sidewall 6. The bead 8 includes a core 18 and an apex 20 extended outward in the radial direction from the core 18. The core 18 is ring-shaped and includes a plurality of non-extensible wires (typically, steel wires). The apex 20 is outward tapered in the radial direction and is formed by a crosslinked rubber having a high hardness. In FIG. 1, a solid line BBL represents a bead base line. The bead base line passes through an underside of the core 18 and is extended in an axial direction. A point PH is an intersecting point of the bead base line and an outside surface in the axial direction of the bead 8. The point PH is a heel of the bead 8.

The carcass 10 is laid between the beads 8 on both sides along the insides of the tread 4 and the sidewall 6. The carcass 10 includes a first carcass ply 22 and a second carcass ply 24. The second carcass ply 24 is provided on an outside in the radial direction of the first carcass ply 22. The first carcass ply 22 is turned up around the bead 8 from the inside toward the outside in the axial direction.

The first carcass ply 22 is constituted by a first carcass cord and a topping rubber, which is not shown. An absolute value of an angle formed by the first carcass cord with respect to an equator plane is equal to or greater than 60 degrees and is equal to or smaller than 90 degrees. The second carcass ply 24 is constituted by a second carcass cord and a topping rubber. An absolute value of an angle formed by the second carcass cord with respect to the equator plane is equal to or greater than 60 degrees and is equal to or smaller than 90 degrees. In other words, the tire 2 is a radial tire. In the tire 2, the carcass 10 is constituted in such a manner that the angle formed by the first carcass cord with respect to the equator plane is reverse to the angle formed by the second carcass cord with respect to the equator plane when absolute values of the angles formed by the first carcass cord and the second carcass cord with respect to the equator plane are smaller than 90 degrees. The first carcass cord and the second carcass cord are usually constituted by an organic fiber. Examples of a preferable organic fiber include a polyester fiber, a nylon fiber, a rayon fiber, a polyethylene naphthalate fiber and an aramid fiber.

The belt 12 is positioned on an outside in the radial direction of the carcass 10. The belt 12 is provided on the carcass 10 along an inside of the tread 4. The belt 12 reinforces the carcass 10. The belt 12 is constituted by a belt ply 26. Two sheets or more of the belt plies 26 may be used for the belt 12.

Figure 2:
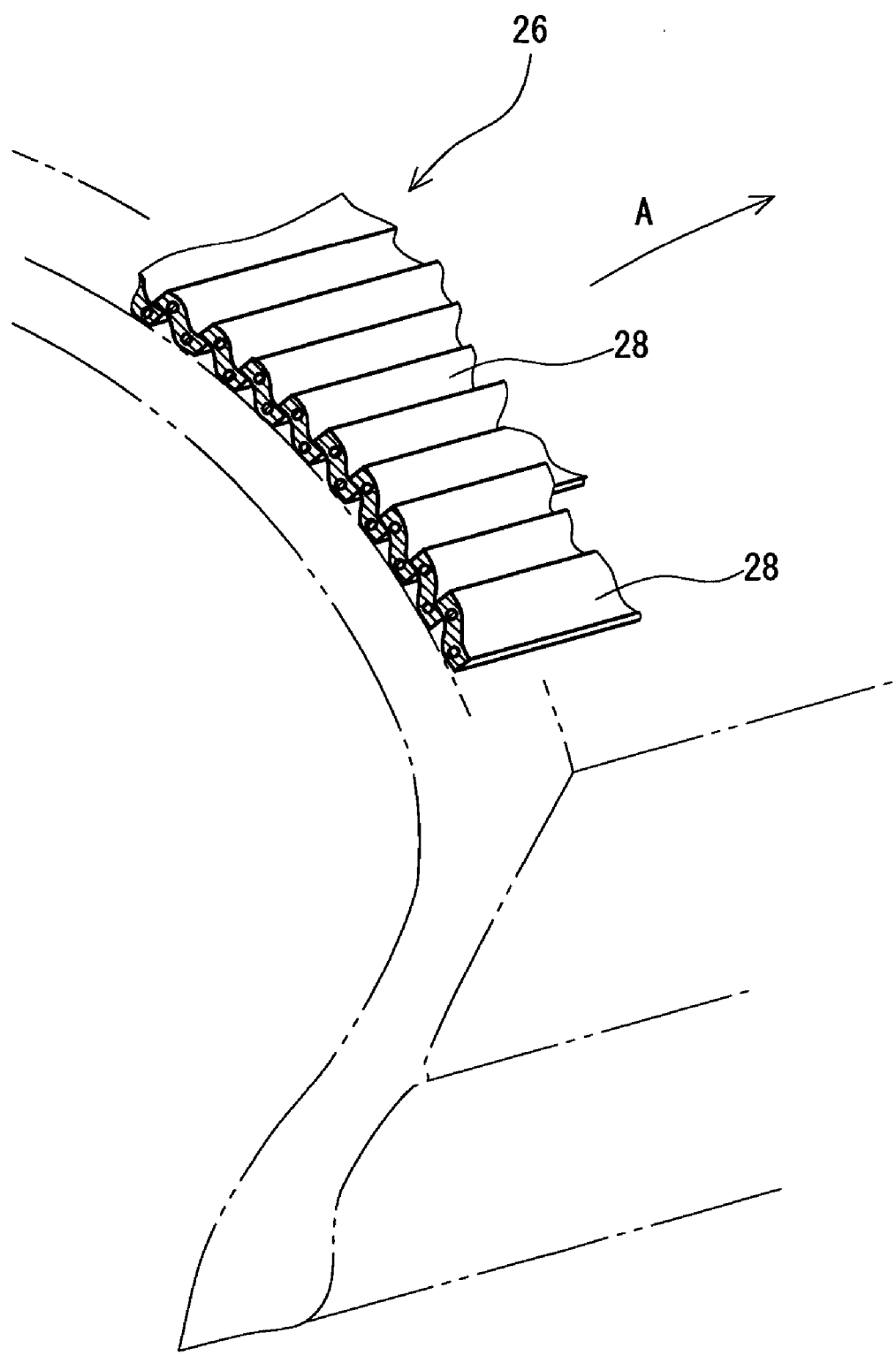
FIG. 2 is a sectional perspective view showing a belt ply before a vulcanizing step.

FIG. 2 is a sectional perspective view showing the belt ply 26 before a vulcanizing step. In FIG. 2, a circumferential direction of the tire 2 is shown in an arrow A. The belt ply 26 is formed by spirally winding a long ribbon 28 circumferentially on an outside in the radial direction of the carcass 10. An absolute value of an angle formed by the ribbon 28 with respect to the equator plane is equal to or smaller than 5 degrees. In this specification, a structure of the belt 12 on which the ribbon 28 is wound circumferentially is referred to as a jointless structure.

Figure 3:
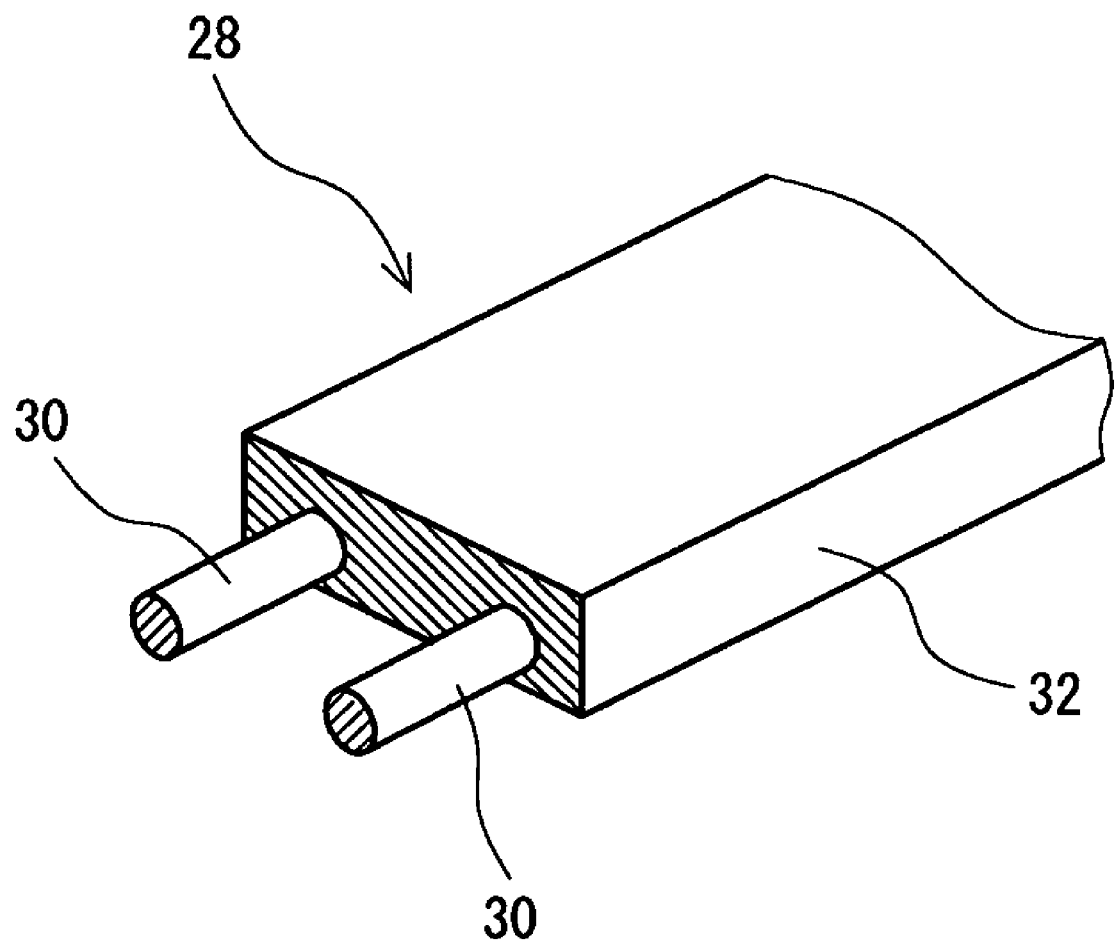
FIG. 3 is an enlarged sectional perspective view showing a ribbon of the belt ply in FIG. 2.

FIG. 3 is an enlarged sectional perspective view showing the ribbon 28 of the belt ply 26 in FIG. 2. As shown in FIG. 3, the ribbon 28 is constituted by two belt cords 30 provided in parallel and a topping rubber 32. The belt cord 30 is buried in the topping rubber 32. The belt cord 30 is extended in a longitudinal direction of the ribbon 28. As described above, the ribbon 28 is spirally wound circumferentially. Therefore, the belt cord 30 is also wound spirally and circumferentially. In other words, the belt cord 30 is also jointless. An absolute value of an angle formed by the belt cord 30 with respect to the equator plane is equal to or smaller than 5 degrees. The belt cord 30 uniformly conforms to the carcass 10. The number of the belt cords 30 in the ribbon 28 may be one or may be three or more. As shown in FIG. 2, it is preferable that a part of the ribbon 28 should overlap with the adjacent ribbon 28 in the circumferential winding. Consequently, a positional shift of the belt ply 26 can be prevented reliably. The belt cord 30 is formed by an organic fiber or steel. Examples of a preferable organic fiber include a nylon fiber, a rayon fiber, an aramid fiber, a polyethylene naphthalate fiber and a polyester fiber.

The inner liner 14 is bonded to the inner peripheral surface of the carcass 10. The inner liner 14 is formed by a crosslinked rubber. A rubber having a low air permeability is used for the inner liner 14. The inner liner 14 plays a part in holding the internal pressure of the tire 2.

As shown in FIG. 1, the first carcass ply 22 includes a turned-up portion 34 extended almost outward in a radial direction and a turned-up end 36 positioned on an outside in the radial direction of the turned-up portion 34. The second carcass ply 24 includes an inner end 38 positioned on an inside in the radial direction. The turned-up end 36 is provided on an inside of the second carcass ply 24. The turned-up end 36 is provided on an outside in the radial direction from the inner end 38. The turned-up end 36 is covered with the second carcass ply 24. Therefore, the turned-up portion 34 sufficiently reinforces the carcass 10. The carcass 10 has a high stiffness. The tire 2 generates a sufficient cornering force. In cornering, a twist is not generated on the tire 2.

In FIG. 1, a double arrow line LT represents a half circumferential length of the tread surface 16. A point PT represents a tread end. A point placed on the tread surface 16 and having a circumferential length from the tread end PT which is a quarter of the circumferential length LT is indicated as PA. A two-dotted chain line VL is a straight line obtained by connecting the tread end PT and a point PH. A middle point of the straight line VL is indicated as PB. In the tire 2, the point PB is provided on an external surface 40 of the sidewall 6. In the case in which the middle point of the straight line VL is not placed on the external surface 40 of the sidewall 6, an intersecting point of a straight line obtained by connecting the middle point of the straight line VL and the external surface 40 of the sidewall 6 in the shortest distance and the external surface 40 of the sidewall 6 is set to be PB.

In FIG. 1, a point P1 represents a position on an external surface 42 of the tire 2 which corresponds to the turned-up end 36. The point P1 is an intersecting point of a straight line obtained by connecting the turned-up end 36 and the external surface 42 in the shortest distance and the external surface 42. A point P2 represents a position on the external surface 42 of the tire 2 which corresponds to the inner end 38. The point P2 is an intersecting point of a straight line obtained by connecting the inner end 38 and the external surface 42 in the shortest distance and the external surface 42. A range from the point P1 to the point P2 corresponds to an overlap of the turned-up portion 34 and the second carcass ply 24 in the external surface 42.

In the tire 2, the point P1 is placed on an inside in the radial direction from the point PA and an outside in the radial direction from the tread end PT. The point P2 is placed on an outside in the radial direction from the point PB and an inside in the radial direction from the tread end PT. In the tire 2, the structure of the carcass 10 is controlled. Consequently, the range corresponding to the overlap of the turned-up portion 34 and the second carcass ply 24 is included from the point PA to the point PB. In the tire 2, the overlap of the turned-up portion 34 and the second carcass ply 24 is provided in a proper position of the tire 2. The carcass 10 effectively increases the stiffness of the tire. The tire 2 damages neither a handling stability nor a ride comfort and is excellent in a cornering stability.

In FIG. 1, a double arrow line L1 represents a circumferential length from the tread end PT to the point P1. A double arrow line L2 represents a length from the tread end PT to the point P2. A double arrow line LH represents a length from the tread end PT to the heel PH.

In the tire 2, it is preferable that a ratio of the circumferential length L1 to the circumferential length LT should be equal to or higher than 0.05 and be equal to or lower than 0.20. In the tire 2 having the ratio set to be equal to or higher than 0.05, a stiffness in the vicinity of the tread 4 is high. The tire 2 is excellent in the cornering stability. From this viewpoint, the ratio is more preferably equal to or higher than 0.07 and is particularly preferably equal to or higher than 0.10. By setting the ratio to be equal to or lower than 0.20, it is possible to maintain a shock absorption. The tire 2 is excellent in the ride comfort. From this viewpoint, the ratio is more preferably equal to or lower than 0.18 and is particularly preferably equal to or lower than 0.15. In the tire 2, the point P1 is positioned on an inside in the radial direction from the point PA. Therefore, an upper limit value of the ratio is 0.25.

In the tire 2, it is preferable that a ratio of the length L2 to the length LH should be equal to or higher than 0.10 and be equal to or lower than 0.40. In the tire 2 having the ratio set to be equal to or higher than 0.10, a stiffness in the vicinity of the tread 4 is high. The tire 2 is excellent in the cornering stability. From this viewpoint, the ratio is more preferably equal to or higher than 0.15 and is particularly preferably equal to or higher than 0.20. By setting the ratio to be equal to or lower than 0.40, it is possible to maintain the shock absorption. The tire 2 is excellent in the ride comfort. From this viewpoint, the ratio is more preferably equal to or lower than 0.35 and is particularly preferably equal to or lower than 0.30. In the tire 2, the point P2 is positioned on an outside in the radial direction from the point PB. Therefore, an upper limit value of the ratio is 0.50.

The dimension and the angle of the tire 2 are measured in a state in which the tire 2 is incorporated in a normal rim and the tire 2 is filled with air to obtain a normal internal pressure. During the measurement, a load is not applied to the tire 2. In this specification, the normal rim implies a rim determined in rules on which the tire 2 depends. A "standard rim" in the JATMA rules, a "Design Rim" in the TRA rules and a "Measuring Rim" in the ETRTO rules are included in the normal rim. In this specification, the normal internal pressure implies an internal pressure determined in the rules on which the tire 2 depends. A "maximum air pressure" in the JATMA rules, a "maximum value" described in "TIRE LOAD LIMITS AT VARIOUS COLD INFLATION PRESSURES" in the TRA rules and an "INFLATION PRESSURE" in the ETRTO rules are included in the normal internal pressure.

EXAMPLES

Example 1

A tire for a motorcycle according to an example 1 which has the basic structure shown in FIG. 1 and specifications shown in the following Table 1 was obtained. The tire has a size of 120/70ZR17. One belt ply was used for a belt. A belt cord used in the belt ply is steel. An angle formed by the belt cord with respect to an equator plane is substantially zero degree. For a carcass, a first carcass ply and a second carcass ply were used. A first carcass cord used in the first carcass ply is a nylon fiber. A second carcass cord used in the second carcass ply is the nylon fiber. Angles formed by the first carcass cord and the second carcass cord with respect to the equator plane are substantially 90 degrees. The angle formed by the first carcass cord with respect to the equator plane is equal to the angle formed by the second carcass cord with respect to the equator plane. The first carcass cord and the second carcass cord have a fineness of 1400 dtex/2. The first carcass ply is turned up around a bead from an inside toward an outside in an axial direction. The second carcass ply is not turned up around the bead. A turned-up end of the first carcass ply is positioned on an inside of the second carcass ply. A ratio (L1/LT) of a circumferential length L1 from a tread end PT to a point P1 corresponding to a position of the turned-up end to a circumferential length LT of a tread surface is 0.20. A ratio (L2/LH) of a length L2 from the tread end PT to a point P2 corresponding to a position of an inner end of the second carcass ply to a length LH from the tread end PT to a heel PH is 0.40.

Comparative Example 1 and Example 3

A tire was obtained in the same manner as in the example 1 except that the ratio (L1/LT) was set as shown in the following Table 1.

Comparative Example 2

A tire was obtained in the same manner as in the example 1 except that the ratio (L2/LH) was set as shown in the following Table 1.

Comparative Example 2 and Example 4

A tire was obtained in the same manner as in the example 1 except that the ratio (L1/LT) and the ratio (L2/LH) were set as shown in the following Table 1.

Comparative Example 3

A tire was obtained in the same manner as in the example 1 except that a turned-up end of a first carcass ply was disposed on an outside of a second carcass ply.

Comparative Example 4

A tire was obtained in the same manner as in the example 1 except that a turned-up end of a first carcass ply was disposed on an outside of a second carcass ply and a ratio (L1/LT) and a ratio (L2/LH) were set as shown in the following Table 1.

Comparative Example 5

A conventional tire put on the market is taken as a comparative example 5. In the tire, a first carcass ply and a second carcass ply are turned up around a bead from an inside toward an outside in an axial direction.

[Actual Vehicle Evaluation]

A trial tire was attached to a front wheel of a motorcycle (four cycles) having a displacement of 1000 cm$^3$ and put on the market. A rim has a size of MT 3.50×17. The air of the tire has an internal pressure of 250 kPa. A conventional tire put on the market is attached to a rear wheel. In a circuit course constituted by a dry asphalted road, cornering at a speed of 100 km/h to 150 km/h and straight running at a speed of 250 km/h to a maximum speed of a vehicle (approximately 280 km/h) were executed and a rider carried out a functional evaluation having a full point set to be 5.0. It is indicated that the function is more excellent if the numeric value is greater. Items for the evaluation include a cornering stability and a shock absorption. The result is shown in the following Table 1.

TABLE 1

Specification of tire and result of evaluation.

|  | Example 2 | Example 3 | Example 1 | Example 4 | Comp. Example 1 | Comp. Example 2 | Comp. Example 3 | Comp. Example 4 | Comp. Example 5 |
|---|---|---|---|---|---|---|---|---|---|
| Presence of turned-up portion of first carcass ply | Yes | Yes | Yes | Yes | Yes | Yes | Yes | Yes | Yes |
| Presence of turned-up portion of second carcass ply | No | No | No | No | No | No | No | No | Yes |
| Position of turned-up portion of first carcass ply*) | A | A | A | A | A | A | B | B | — |
| L1/LT | 0.10 | 0.10 | 0.20 | 0.25 | 0.30 | 0.20 | 0.20 | 0.10 | — |
| L2/LH | 0.30 | 0.40 | 0.40 | 0.50 | 0.40 | 0.60 | 0.40 | 0.30 | — |
| Cornering stability | 4.5 | 4.5 | 4.5 | 4.0 | 3.0 | 4.0 | 3.5 | 3.0 | 3.5 |
| Shock absorption | 4.0 | 4.0 | 4.0 | 4.0 | 4.0 | 3.0 | 3.5 | 3.5 | 3.0 |

*)The case in which a turned up end of a first carcass ply is positioned on an inside of a second carcass ply is represented as A and the cass in which the turned-up end of the first carcass ply is positioned on an outside of the second carcass ply is represented as B.

As shown in the Table 1, it was confirmed that the tire according to each of the examples is excellent in a cornering stability and a shock absorption. From the result of the evaluation, the advantages of the present invention are apparent.

The above description is only illustrative and various changes can be made without departing from the scope of the present invention.

What is claimed is:

1. A pneumatic tire for a motorcycle comprising: a tread having an external surface to form a tread surface, a pair of sidewalls extended almost inward in a radial direction from an end of the tread, a pair of beads extended almost inward in the radial direction from the sidewalls, a carcass laid between both of the beads inside along the tread and the sidewalls, and a belt provided on the carcass at an inside position in the radial direction of the tread, wherein the belt includes a belt ply, the belt ply is formed by a ribbon wound spirally in a circumferential direction of the tire, the ribbon has a belt cord, an absolute value of an angle formed by the belt cord with respect to an equator plane is equal to or smaller than 5 degrees, the carcass includes a first carcass ply and a second carcass ply provided outside in the radial direction of the first carcass ply, the first carcass ply is constituted by a first carcass cord and a topping rubber, an absolute value of an angle formed by the first carcass cord with respect to the circumferential direction is equal to or greater than 60 degrees and is equal to or smaller than 90 degrees, the second carcass ply is constituted by a second carcass cord and a topping rubber, an absolute value of an angle formed by the second carcass cord with respect to the circumferential direction is equal to or greater than 60 degrees and is equal to or smaller than 90 degrees, the first carcass ply is turned up around the bead, the first carcass ply includes a turned-up portion extended almost outward in the radial direction and a turned-up end positioned outside in the radial direction of the turned-up portion, the second carcass ply includes an inner end positioned radially below the turned-up end of the first carcass ply and axially outside the first carcass ply, but not extending to the bead, if a point placed on the tread surface and having a circumferential length from the tread end which is a quarter of a half of a circumferential length of the tread surface is represented by PA, a middle point of a straight line connecting the tread end and a heel of the bead is represented by PB, a point on an external surface of the tire which corresponds to the turned-up end is represented by P1 and a point on the external surface of the tire which corresponds to an inner end is represented by P2, the point P1 is positioned inside in the radial direction from the point PA, the point P2 is positioned outside in the radial direction from the point PB, the point P1 is positioned outside in a radial direction from the end of the tread, and a circumferential length from the tread end to the point P1 is represented by L1 whereby a ratio of the circumferential length L1 to half the circumferential length of the tread is equal to or greater than 0.05.

2. The pneumatic tire of claim 1, wherein the ratio of the circumferential length L1 to half of the circumferential length of the tread is equal to or greater than 0.10.

3. The pneumatic tire of claim 1, wherein the ratio of the circumferential length L1 to half of the circumferential length of the tread is equal to or lower than 0.20.

4. The pneumatic tire of claim 3, wherein the ratio of the circumferential length L1 to half of the circumferential length of the tread is equal to or greater than 0.10.

* * * * *